United States Patent
Lee

(10) Patent No.: US 10,507,794 B2
(45) Date of Patent: Dec. 17, 2019

(54) SYSTEM AND METHOD FOR VEHICLE CONTROL

(71) Applicants: Hyundai Motor Company, Seoul (KR); Kia Motors Corporation, Seoul (KR)

(72) Inventor: Jeongtae Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 48 days.

(21) Appl. No.: 15/823,807

(22) Filed: Nov. 28, 2017

(65) Prior Publication Data

US 2019/0061685 A1  Feb. 28, 2019

(30) Foreign Application Priority Data

Aug. 22, 2017  (KR) .......................... 10-2017-0105809

(51) Int. Cl.
  *B60R 25/20*  (2013.01)

(52) U.S. Cl.
  CPC ...... *B60R 25/209* (2013.01); *B60R 2325/205* (2013.01)

(58) Field of Classification Search
  CPC .................. B60R 25/209; B60R 2325/205
  See application file for complete search history.

(56) References Cited

U.S. PATENT DOCUMENTS

| | | | | |
|---|---|---|---|---|
| 9,156,437 B2* | 10/2015 | Kim | ...................... | B60R 25/209 |
| 9,807,570 B1* | 10/2017 | Lazarini | ................ | H04W 4/046 |
| 2014/0274013 A1* | 9/2014 | Santavicca | .......... | G07C 9/00309 455/418 |
| 2015/0057884 A1* | 2/2015 | Bongiorno | .............. | B60R 25/24 701/36 |
| 2015/0235486 A1* | 8/2015 | Ellis | ................... | G07C 9/00309 340/5.61 |
| 2016/0231421 A1* | 8/2016 | Murakami | ............ | B60R 25/245 |
| 2016/0272154 A1* | 9/2016 | Sanji | ....................... | B60R 25/24 |
| 2018/0234797 A1* | 8/2018 | Ledvina | .................. | B60R 25/24 |
| 2018/0302859 A1* | 10/2018 | Elangovan | ........ | H04W 52/0235 |

* cited by examiner

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A system and method for a vehicle control are provided. The system provides a smartkey-free starting function of a vehicle and includes a communicating unit that has a radio frequency (RF) antenna and a low frequency (LF) antenna and connects wireless communication with a user terminal which is within a predetermine sensing distance through the RF antenna. A body controller executes a door unlock according to a remote control signal of the user terminal. A door sensor senses door open and door closed signals and a start stop button generates a start on signal based on a button input. A controller initiates a starting of the vehicle when vehicle start condition of a state in which the user terminal is connected through the LF antenna of the communicating unit forming a communication region in the vehicle is satisfied, when the start on signal is input.

17 Claims, 4 Drawing Sheets

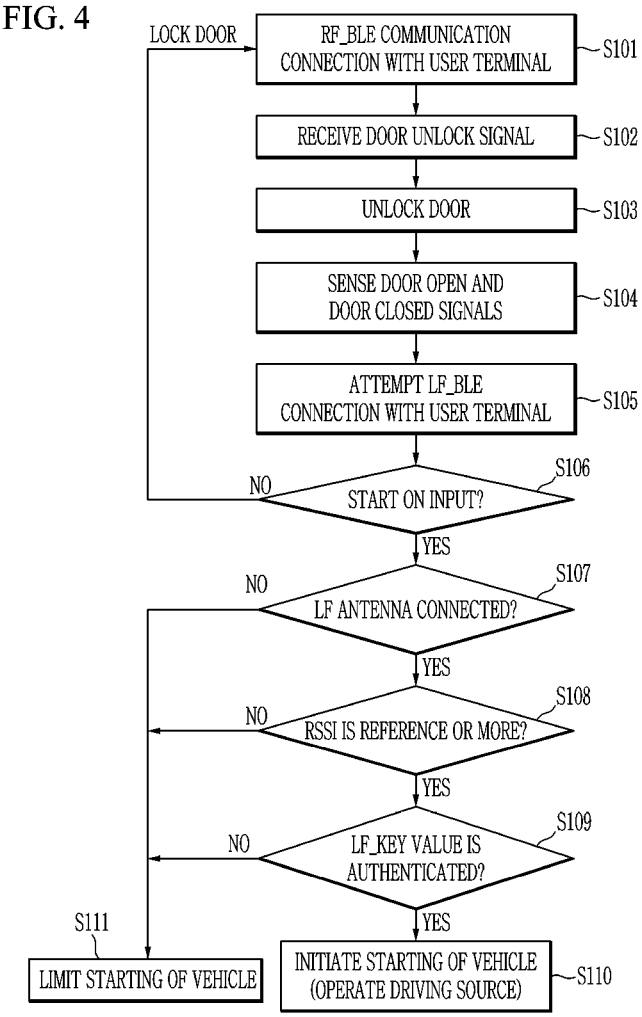

SYSTEM AND METHOD FOR VEHICLE CONTROL

CROSS-REFERENCE TO RELATED APPLICATION

This application claims priority to and the benefit of Korean Patent Application No. 10-2017-0105809 filed on Aug. 22, 2017, the entire contents of which are incorporated herein by reference.

BACKGROUND (a) Field of the Invention

The present invention relates to a system and method for a vehicle control, and more particularly, to a system and method for a vehicle control supporting a smartkey-free starting function capable of starting a vehicle without a key.

(b) Description of the Related Art

In general, a smartkey (also referred to as a Fob Key) of a vehicle is a device that allows a user (driver) to open or close doors and start the vehicle without inserting a separate key or operating a start button. The vehicle may be necessarily started in a state in which the user has the smartkey, and in particular, when a connected vehicle, a method is known in which the user starts the vehicle through a telematics service, rides in the vehicle, and then switches to a normal starting. Meanwhile, as research for the connected vehicle has recently increased, smartkey-free starting methods are being developed in which the user directly starts the vehicle using a smartphone possessed by the user without using the smartkey. Among others, representative methods include technologies using Near Field communication (NFC) and Bluetooth Low Energy (BLE) communication of smartphones.

In particular, since the NFC is a method in which the user is directly in contact with the smartphone, it is excellent in security, but has a disadvantage in that a communication distance is short and thus, it is inconvenient to use the NFC since the user is required to be in contact with the smartphone (NFC) every time to open or close the door or starting the vehicle, and the cost of related parts for recognition is increased. Therefore, a development for the smartkey-free starting technology using the BLE communication is highlighted.

FIG. 1 is an illustrative view illustrating a smartkey-free starting method using a conventional BLE and a problem thereof according to the related art. Referring to FIG. 1, a conventional smartkey-free starting vehicle is connected to a smartphone of a user via BLE communication to unlock a door of the vehicle and to start the vehicle. However, since the BLE operates at a communication distance within about 100 m based on BT ver4.2, it is vulnerable to security and the vehicle may be started by others when a signal is hacked within the above-mentioned distance. Therefore, in developing the smartkey-free starting function for the connected vehicle, there is a strong demand for a method for further improving security.

The above information disclosed in this section is merely for enhancement of understanding of the background of the invention and therefore it may contain information that does not form the prior art that is already known in this country to a person of ordinary skill in the art.

SUMMARY

The present invention provides a system and method for a vehicle control having advantages of improving security of a vehicle starting control in developing a smartkey-free starting function for a connected vehicle.

An exemplary embodiment of the present invention provides a system for a vehicle control providing a smartkey-free starting function of a vehicle that may include a communicating unit having a radio frequency (RF) antenna and a low frequency (LF) antenna and configured to connect wireless communication with a user terminal which is within a predetermined sensing distance via the RF antenna; a body controller configured to operate a door unlock based on a remote control signal of the user terminal; a door sensor configured to sense door open and door closed signals; a start stop button configured to generate a start on signal by a button input; and a controller configured to initiate a starting of the vehicle when a vehicle start condition of a state in which the user terminal is connected via the LF antenna of the communicating unit forming a communication region in the vehicle is satisfied, when the start on signal is input.

The communicating unit may include Bluetooth low energy. Additionally, the communicating unit may include an RF antenna configured to radiate an RF signal to the outside of the vehicle and perform a remote wireless communication connection with the user terminal; an LF antenna configured to radiate an LF signal to the inside of the vehicle and perform a local wireless communication connection with the user terminal within the vehicle; and a control module configured to store authentication information of a first key value and a second key value which are independent from each other for each connecting the user terminal via the RF antenna or the LF antenna.

The control module may be configured to connect the user terminal via the LF antenna and confirm a boarding state of a user (e.g., determine whether the user enters the vehicle), when the door open and door closed signals of the sensor are generated after the door unlock. The control module may be configured to check received signal strength indicator (RSSI) of the user terminal via the LF antenna and determine that the user terminal is located inside the vehicle when the RSSI is a reference value or greater. The control module may further be configured to perform authentication with the second key value which is different from the first key value used in the connection of the RF antenna during the wireless communication connection between the LF antenna and the user terminal.

The controller may be configured to limit the starting of the vehicle when any one of vehicle starting conditions that the RSSI of the user terminal is the reference value or greater and the user terminal is connected to the LF antenna with the authentication by the second key value which is different from the RF antenna is not satisfied. The controller may be configured to transmit the start on signal to any one driving source of an engine, a driving motor, and a fuel cell stack based on the type of the vehicle and initiate the starting of the vehicle. The communicating unit may be implemented by any one communication device of Wifi, wireless LAN, radio frequency (RF), and Zigbee that perform local communication connection with the user terminal.

Another exemplary embodiment of the present invention provides a method for a vehicle control of a system for a vehicle control providing a smartkey-free starting function of a vehicle including connecting wireless communication with a user terminal which is within a sensing distance of Bluetooth low energy (BLE) communication via a radio frequency (RF) antenna of a communicating unit; unlocking a door using a body controller when a door unlock signal is received from the user terminal; attempting a wireless communication connection with the user terminal via a low frequency (LF) antenna of the communicating unit forming a BLE communication region in the vehicle, when a door sensor senses door open and door closed signals; and initiating a starting of the vehicle when a vehicle starting condition of a state in which the user terminal is connected via the LF antenna is satisfied, when a start on signal is input through a start stop button.

The connecting of the wireless communication with the user terminal may include performing a pairing with the user terminal and connecting the wireless communication when authentication with a unique first key value which is registered in advance is successful to approve an open and close operation of the door. The unlocking of the door may include transmitting a response based on the unlock of the door to the user terminal via the communicating unit. In the unlocking of the door, the door may be switched to a locked state when the vehicle start on signal is not input within a predetermined time after the unlock of the door and a connection state of the wireless communication may be checked at a predetermined period.

The pairing of the wireless communication connection with the user terminal may include radiating an LF signal of the LF antenna to an inside region of the vehicle and connecting the wireless communication when authentication with a second key value of the user terminal is successful; or determining that the user terminal is not inside the vehicle when the connection via the LF antenna fails and maintaining the connection state via the RF antenna. In the initiating of the starting of the vehicle, the starting of the vehicle may be initiated when the vehicle starting condition authenticated with an independent second key value which is different from the first key value used in the connection of the RF antenna is further satisfied during the connection of the LF antenna.

In the initiating of the starting of the vehicle, the starting of the vehicle may be initiated when a vehicle starting condition of a state in which received signal strength indicator (RSSI) of the user terminal measured by the LF antenna is a reference value or greater is further satisfied. In addition, in the initiating of the starting of the vehicle, the starting of the vehicle may be limited when any one of the vehicle starting conditions of the connection of the user terminal via the LF antenna, the authentication with the independent second key value, and the received signal strength indicator (RSSI) is not satisfied.

According to an exemplary embodiment of the present invention, since the vehicle may be started only when the user terminal is within the vehicle, it may be possible to prevent the intruder from arbitrarily opening the door and operating the vehicle even though the door is unlocked outside the vehicle by the user. By limiting the BLE communication range conforming to the vehicle starting condition using the user terminal to the interior of the vehicle, an environment in which the signal may be seized and processed from the outside may not be provided and may be basically blocked, thereby providing a more stable smart-key-free starting service. Further, it may be possible to confirm the position of the user terminal existing outside and inside the vehicle using the RF antenna and the LF antenna that connect the BLE communication with the user terminal and to provide the allowed smart-key free control function according to the confirmed position of the user terminal.

BRIEF DESCRIPTION OF THE DRAWINGS

The above and other aspects, features and advantages of the present disclosure will be more apparent from the following detailed description taken in conjunction with the accompanying drawings, in which:

FIG. 4 is a flowchart schematically illustrating a method for a vehicle control for a smartkey-free starting control according to an exemplary embodiment of the present invention.

DETAILED DESCRIPTION

Figure 1:
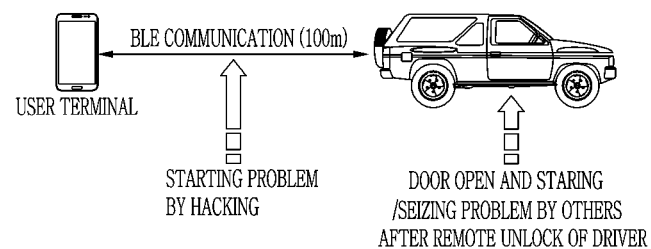
FIG. 1 is an illustrative view illustrating a smartkey-free starting method using a conventional BLE and a problem thereof according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
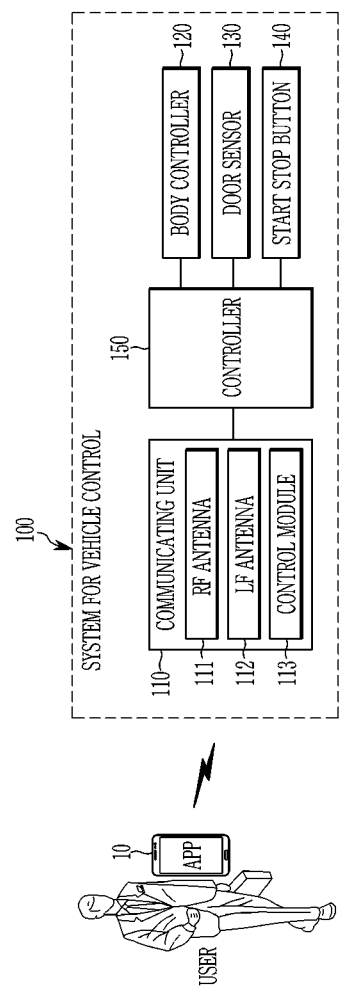
FIG. 2 is a block diagram schematically illustrating a configuration of a system for a vehicle control according to an exemplary embodiment of the present invention.

Hereinafter, a system and method for a vehicle control according to exemplary embodiments of the present invention will be described in detail with reference to the accompanying drawings. FIG. 2 is a block diagram schematically illustrating a configuration of a system for a vehicle control according to an exemplary embodiment of the present invention. Referring to FIG. 2, a system 100 for a vehicle control according to an exemplary embodiment of the present invention may include a communicating unit 110, a body control module (BCM) 120, a door sensor 130, a start stop button (SSB) 140, and a controller 150.

The communicating unit 110 may be configured to connect wireless communication with a user terminal 10 and perform communication for supporting a smartkey-free function of a vehicle. The user terminal 10, which is an information communication terminal possessed by a user, may include a smartphone, a wearable terminal, a notebook, a tablet person computer (PC), or the like capable of communicating with the communicating unit 110. The user terminal 10 may be installed with an application program (hereinafter, referred to as APP) for a smartkey-free function according to an exemplary embodiment of the present invention. For example, the communicating unit 110 may include Bluetooth Low Energy (BLE) and the BLE may be configured to communicate with the user terminal 10 within about 100 m based on BT ver4.2. The BLE is not limited to BT ver4.2 version, but other versions may be applied and a communication distance may be changed accordingly.

The communicating unit 110 may be mounted in an audio, video, navigation (AVN) or a telematics unit, and may include a radio frequency (RF) antenna 111, a low frequency (LF) antenna 112, and a control module 113. The RF antenna 111 may be configured to radiate an RF signal around the vehicle and connect remote wireless communication with the user terminal 10 existing outside the vehicle. The LF antenna 112 may be configured to radiate an LF signal to an interior of the vehicle and connect local wireless communication with the user terminal 10 within the vehicle. The control module 113 may be configured to execute an overall operation for connecting the user terminal 10 with BLE communication using the RF antenna 111 and the LF antenna 112.

In particular, the control module 113 may be configured to store authentication information of a first key value and a second key value which are independent from each other for each connecting wireless communication with the user terminal 10 using the RF antenna 111 and the LF antenna 112.

In addition, the control module 113 may be configured to perform authentication with an independent unique key value of each of the antennas when the wireless communication is connected to the user terminal and connect the user terminal 10 successful in authentication. For example, FIG. 3 is a conceptual view illustrating a method for connecting a user terminal with a communicating unit according to an exemplary embodiment of the present invention.

Figure 3:
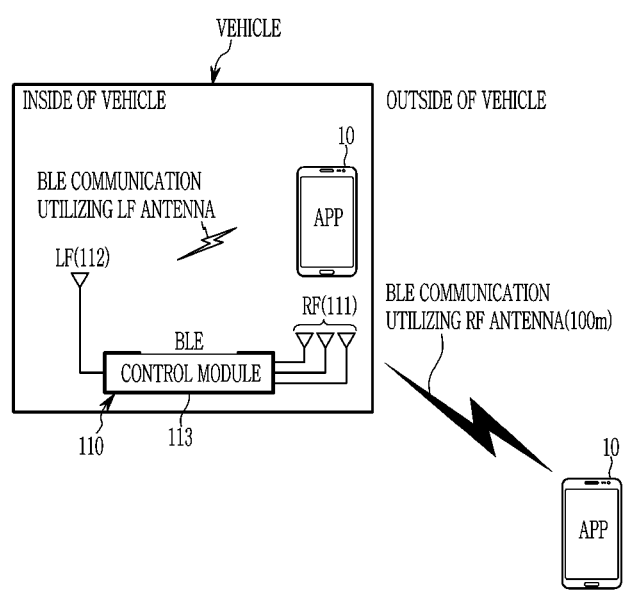
FIG. 3 is a conceptual view illustrating a method for connecting a user terminal with a communicating unit according to an exemplary embodiment of the present invention.

Referring to FIG. 3, the communicating unit 110 according to an exemplary embodiment of the present invention may include four multi-input systems based on BT ver.4.2 and may include three RF antennas 111 for remote communication outside the vehicle and one LF antenna 112 for local communication inside the vehicle. The RF antenna 111, which is a basic antenna of BLE, may be connected to the user terminal 10 within about 100 m, which is a maximum sensing distance to receive remote control signals of door unlock and door lock. The LF antenna 112 may be configured to perform communication connection with the user terminal 10 within the vehicle. In particular, the LF antenna 112 forms a communication region for Bluetooth communication inside the vehicle and operates as an indoor antenna for determining whether the user terminal 10 is within the vehicle.

The control module 113 may be configured to perform a pairing with the user terminal 10 within the sensing distance of the RF antenna 111 and connect wireless communication with the user terminal 10 successful in authentication of a unique first key value which is registered in advance. In other words, when the user terminal 10 is extraneous to the vehicle, the control module 113 may be configured to connect the wireless communication using the RF antenna 111. In particular, the control module 113 may be configured to unlock a door by transmitting the door unlock signal received via the RF antenna 111 from the user terminal 10 to the body controller 120.

Further, when the control module 113 confirms door open and door closed signals of the sensor 130 after the door unlock signal is received, the control module 113 may be configured to connect the user terminal 10 via LF antenna 112 to confirm a boarding state of a user (e.g., whether the user enters the vehicle). Accordingly, when the user terminal 10 is within the vehicle, the connection via the RF antenna 111 may be switched to the connection through the LF antenna 112.

Therefore, the control module 113 of the communicating unit 110 may be configured to check received signal strength indicator (RSSI) using LF antenna 112 which is tuned for each of the vehicles and determine that the user terminal 10 is within an allowed range inside the vehicle when RSSI is a reference value or greater. Further, when the LF antenna 112 and the user terminal 10 are in communication with each other, the control module 113 may be configured to perform authentication with independent second key value which is different from the case of the connection of the RF antenna 111.

Particularly, when the RSSI of the user terminal 10 is the reference value or greater and the user terminal 10 is connected to the LF antenna 112 using the authentication of the second key value which is different from the first key vale are defined as states in which a smartkey-free vehicle starting condition corresponding to a vehicle boarding of the user according to an exemplary embodiment of the present invention is satisfied. When the RSSI through LF antenna 112 is the reference value or less, or the authentication with the second key value which is different from the first key value of the RF antenna 111 fails, the control module 113 may be configured to determine that the vehicle starting condition is not satisfied.

In other words, when any one of the defined vehicle starting conditions is not satisfied, the vehicle may not be started, and since a motor-driven power steering (MDPS) also locks and does not move, the vehicle may not be driven. Therefore, the system 100 for a vehicle control according to an exemplary embodiment of the present invention may improve security of a starting control since a vehicle starting function is limited when all the vehicle starting conditions are not satisfied, even though a corresponding signal is accessed by a hacking of an intruder in a state in which the communicating unit 110 is connected to the user terminal via RF antenna 111.

Referring again to FIG. 2, the body controller 120 may be configured to unlock or lock the door according to the remote control signal received from the communicating unit 110. Further, the body controller 120 may further be configured to open a tail gate, operate a door window, and operate an emergency light and an alarm sound output for displaying a parking position of the vehicle according to instructions of the remote control signal. The instructions may be input through the APP of the user terminal 10. The door sensor 130 may be configured to sense the door open and door closed signals after the door unlock. With starting the open/closed sensing of the vehicle door, the vehicle starting may be determined. The start stop button 140 may be configured to generate a start on signal in response to a button input when the vehicle starting conditions are satisfied and generate a start off signal in response to a button input in a state in which the vehicle is started.

Further, the controller 150 may be configured to execute an overall operation for a smartkey-free starting control according to an exemplary embodiment of the present invention and may include hardware, programs, and data for the control. The controller 150 may include a smartkey controller (SMK) to which a smartkey-free starting control function is added, but is not limited thereto, and may also include an electronic control unit (ECU) of a super ordinate concept operating a variety of controllers provided to operate the vehicle, including the smartkey controller.

The controller 150 may be configured to execute the vehicle start based on the vehicle starting condition by detecting connection information of the user terminal 10 with the communicating unit 110, whether the door is locked by the body controller 120, the open/closed sensing of the door by the door sensor 130, the input signal of the start button, and an operation state of a driving source of the vehicle. When the controller 150 is connected to the communication with the user terminal 10 via RF antenna 111 of the communicating unit 110 and senses the open and closed signals of the door after the door is unlocked, the controller may be configured to determine whether the user enters the vehicle. In particular, the controller 150 may be configured to search for the user terminal 10 using LF antenna 112 of the communicating unit 110 and detect that the user terminal 10 is located inside the vehicle when which BLE communication is normally connected.

Further, when the controller 150 confirms that the RSSI of the user terminal 10 connected to the LF antenna 112 through the communicating unit 110 is the reference value or greater and the authentication is successful with the independent second key value which is different from the first key value used in the connection of the RF antenna 111, the controller 150 may be configured to determine that the vehicle starting conditions are satisfied. In addition, when the controller 150 is input with the signal of the start stop button 140 when the vehicle starting conditions are satisfied, the controller 150 may be configured to transmit the start on signal to a driving source (not shown) of the vehicle and initiate the starting of the vehicle. The driving source may be any one of an engine, a driving motor, and a fuel cell stack according to a type of the vehicle and an operation thereof may be initiated according to the starting of the vehicle. In addition, the controller 150 may be configured to check a P/N stage state of a transmission and a brake on state, which are starting conditions of an existing smartkey controller, when the signal of the start stop button 140 is input.

Meanwhile, a method for a vehicle control for a smartkey-free starting control according to an exemplary embodiment of the present invention will be described with reference to FIG. 4 based on the configuration of the system 100 for a vehicle control described above. However, since the components of the system 100 of a vehicle control described above may be integrated or further subdivided, hereinafter, in describing the method for a vehicle control according to an exemplary embodiment of the present invention, the subject of each of operations will be described as the system 100 for a vehicle control, not the corresponding components.

FIG. 4 is a flowchart schematically illustrating a method for a vehicle control for a smartkey-free starting control according to an exemplary embodiment of the present invention. Referring to FIG. 4, the system 100 for a vehicle control according to an exemplary embodiment of the present invention may be configured to connect wireless communication with the user terminal 10 which is within in a sensing distance of BLE communication through the RF antenna 111 of the communicating unit 110 (S101). In particular, the system 100 for a vehicle control may be configured to perform a pairing with the user terminal 10, and connect the wireless communication and approve an open and closed control of the door when authentication of a unique first key value which is registered in advance is successful. The process described herein below may be executed by the controller discussed above.

When the system 100 for a vehicle control receives a door unlock signal from the user terminal 10 (S102), the door may be unlocked using the body controller 120. In particular, the system 100 for a vehicle control may respond a unlock acknowledgement (ACK) to the user terminal 10 through the communicating unit 110. When the system 100 for a vehicle control senses the door open and door closed signals through the door sensor 130 (S104), a BLE communication connection may be performed using the LF antenna 112 of the communicating unit 110 to confirm that the user terminal 10 is within the vehicle (S105).

Particularly, the system 100 for a vehicle control may be configured to radiate an LF signal to an indoor region of the vehicle using the LF antenna 112 and connect the wireless communication by authentication of the second key value of the user terminal 10. When the connection through the LF antenna 112 fails during a predetermined period of time (e.g., when the predetermined period of time lapses), the system 100 for a vehicle control may be configured to determine that the user terminal 10 is extraneous to the vehicle and maintain a connection state through the RF antenna 111.

Meanwhile, when the vehicle start on signal is not input within a predetermined period of time (e.g., about 60 seconds) after the door unlock input (No in S106), the system 100 for a vehicle control may be configured to switch the door to a locked state. In addition, the system 100 for a vehicle control may be configured to check the connection state of the BLE communication with the user terminal 10 at a predetermined time period. When the signal on signal is input through the start stop button 140 (Yes in S106), the system 100 for a vehicle control may be configured to determine whether the vehicle starting conditions according to an exemplary embodiment of the present invention are satisfied as follows.

When the user terminal 10 is in a state in which it is connected to the wireless communication via the LF antenna 112 (Yes in S107), RSSI of the user terminal 10 measured by the LF antenna 112 is a reference value or greater (Yes in S108), and the authentication performance with the independent second key value which is different from the connection of the RF antenna 111 during the connection of the LF antenna 112 may be confirmed (Yes in S109), the system 100 for a vehicle control may be configured to determine that all the vehicle starting conditions are satisfied and initiate the vehicle start according to an operation of the driving source (S110).

When any one of the vehicle starting conditions of S107 to S109 is not satisfied (No in S107 or S108 or S109), the system 100 for a vehicle control may be configured to limit the vehicle start (S111). Specifically, when the user terminal 10 is not connected through the LF antenna 112 (No in S107), the system 100 for a vehicle control may be configured to determine that the user is extraneous to the vehicle and limit the vehicle start (S111). Accordingly, a potential intruder may be prevented from arbitrarily opening the door and operating the vehicle even though the door is unlocked through RF antenna 111.

Further, when the RSSI of the user terminal 10 is less than the reference value (No in S108), the system 100 for a vehicle control may be configured to determine that the user around the vehicle is extraneous to the vehicle (e.g., not within the vehicle) and limit the vehicle start (S111). When the authentication with the independent second key value which is different from the connection of the RF antenna 111 is not confirmed during the connection with the LF antenna 112 (No in S109), the system 100 for a vehicle control may also be configured to limit the vehicle start (S111).

Accordingly, since the vehicle may be started only when the user terminal is within the vehicle, it may be possible to prevent an intruder from arbitrarily opening the door and operating the vehicle even though the door is unlocked outside the vehicle. By limiting the BLE communication range conforming to the vehicle starting condition using the user terminal to the interior of the vehicle, an environment in which the signal may be seized and processed from the outside may be prevented and may be blocked, thereby providing a more stable smartkey-free starting service. This may provide a more stable smartkey-free starting service by blocking a physical hacking access separately from additional and complex security solutions such as logins, user function limitations, encryption logic application, and the like. Further, it may be possible to confirm the position of the user terminal existing outside and inside the vehicle using the RF antenna and the LF antenna that connect the BLE communication with the user terminal and to provide the allowed smart-key free control function according to the confirmed position of the user terminal.

Hereinabove, the exemplary embodiments of the present invention have described, but the present invention is not limited thereto and may be variously modified. For example, in the exemplary embodiment of the present invention described above, the communicating unit 110 is assumed to be a BLE module, but is not limited and may be implemented through a local communication module. For example, the communicating unit 110 may also be implemented by at least one of Wifi, wireless LAN, radio frequency (RF), and ZigBee which is capable of performing local communication with the user terminal 10 by the RF and LF antennas which are simultaneously implemented. Therefore, there is an advantage that a smartkey-free start service may be variously performed according to communication type compatible with the type of user terminal 10.

The above-mentioned exemplary embodiments of the present invention are not embodied only by an apparatus and/or method. Alternatively, the above-mentioned exemplary embodiments may be embodied by a program performing functions, which correspond to the configuration of the exemplary embodiments of the present invention, or a recording medium on which the program is recorded. These exemplary embodiments may be easily devised from the description of the above-mentioned exemplary embodiments by those skilled in the art to which the present invention pertains. While the exemplary embodiments of the present invention have been described in detail, it is to be understood that the invention is not limited to the disclosed exemplary embodiments, but on the contrary, is intended to cover various modifications and equivalent arrangements included within the spirit and scope of the appended claims.

DESCRIPTION OF SYMBOLS

100: system for vehicle control
110: communicating unit
111: RF antenna
112: LF antenna
113: control module
120: body controller
130: door sensor
140: start stop button
150: controller

What is claimed is:

1. A system for a vehicle control providing a smartkey-free starting function of a vehicle, comprising:
   a communicating unit including a radio frequency (RF) antenna and a low frequency (LF) antenna and configured to connect wireless communication with a user terminal which is within a predetermined sensing distance through the RF antenna;
   a body controller configured to execute a door unlock according to a remote control signal of the user terminal;
   a door sensor configured to sense door open and door closed signals;
   a start stop button configured to generate a start on signal based on a button input; and
   a controller configured to initiate a starting of the vehicle when a vehicle start condition of a state in which the user terminal is connected through the LF antenna of the communicating unit forming a communication region in the vehicle is satisfied, when the start on signal is input and the door open and door closed signals are sensed.

2. The system of claim 1, wherein the communicating unit includes Bluetooth low energy.

3. The system of claim 1, wherein the communicating unit includes:
   the RF antenna configured to radiate an RF signal to an outside of the vehicle and perform a remote wireless communication connection with the user terminal;
   the LF antenna configured to radiate an LF signal to an inside of the vehicle and perform a local wireless communication connection with the user terminal existing inside the vehicle; and a control module configured to store authentication information of a first key value and a second key value which are independent from each other for each connecting the user terminal through the RF antenna or the LF antenna.

4. The system of claim 3, wherein: the control module is configured to connect the user terminal through the LF antenna and confirm whether a user is within the vehicle, when the door open and door closed signals of the sensor are generated after the door unlock.

5. The system of claim 3, wherein the control module is configured to check received signal strength indicator (RSSI) of the user terminal through the LF antenna and determine that the user terminal is within the vehicle when the RSSI is a reference value or greater.

6. The system of claim 3, wherein the control module is configured to perform authentication with the second key value which is different from the first key value used in the connection of the RF antenna during the wireless communication connection between the LF antenna and the user terminal.

7. The system of claim 6, wherein the controller is configured to limit the starting of the vehicle when any one of vehicle starting conditions that the RSSI of the user terminal is the reference value or greater and the user terminal is connected to the LF antenna with the authentication by the second key value which is different from the RF antenna is not satisfied.

8. The system of claim 1, wherein the controller is configured to transmit the start on signal to a driving source of the vehicle and initiate the starting of the vehicle.

9. The system of claim 1, wherein the communicating unit is implemented by any one communication device of Wifi, wireless LAN, radio frequency (RF), and Zigbee that perform local communication connection with the user terminal.

10. A method for a vehicle control of a system for a vehicle control providing a smartkey-free starting function of a vehicle, comprising:
    connecting, by a controller, wireless communication with a user terminal which is within a sensing distance of Bluetooth low energy (BLE) communication using a radio frequency (RF) antenna of a communicating unit;
    unlocking, by the controller, a door when a door unlock signal is received from the user terminal;
    attempting, by the controller, a wireless communication connection with the user terminal using a low frequency (LF) antenna of the communicating unit forming a BLE communication region in the vehicle, when a door sensor senses door open and door closed signals; and
    initiating, by the controller, a starting of the vehicle when a vehicle starting condition of a state in which the user terminal is connected through the LF antenna is satisfied, when a start on signal is input through a start stop button.

11. The method of claim 10, wherein the connecting of the wireless communication with the user terminal includes:
    performing, by the controller, a pairing with the user terminal and connecting the wireless communication when authentication with a unique first key value which is registered in advance is successful to approve an open and close control of the door.

12. The method of claim 10, wherein the unlocking of the door includes:
    transmitting, by the controller, a response according to the unlock of the door to the user terminal.

13. The method of claim 10, wherein in the unlocking of the door, the door is switched to a locked state when the vehicle start on signal is not input within a predetermined period of time after the unlock of the door input and a connection state of the wireless communication is checked at a predetermined time period.

14. The method of claim 10, wherein the attempting of the wireless communication connection with the user terminal includes:
    radiating, by the controller, an LF signal of the LF antenna to an inside region of the vehicle and connecting the wireless communication when authentication with a second key value of the user terminal is successful; or
    determining, by the controller, that the user terminal is extraneous to the vehicle when the connection through the LF antenna fails and maintaining the connection state through the RF antenna.

15. The method of claim 10, wherein in the initiating of the starting of the vehicle, the starting of the vehicle is initiated when the vehicle starting condition in which authentication is performed with an independent second key value which is different from the first key value used in the connection of the RF antenna is further satisfied during the connection of the LF antenna.

16. The method of claim 15, wherein in the initiating of the starting of the vehicle, the starting of the vehicle is initiated when a vehicle starting condition of a state in which received signal strength indicator (RSSI) of the user terminal measured by the LF antenna is a reference value or greater is further satisfied.

17. The method of claim 16, wherein in the initiating of the starting of the vehicle, the starting of the vehicle is limited when any one of the vehicle starting conditions of the connection of the user terminal through the LF antenna, the authentication with the independent second key value, and the received signal strength indicator (RSSI) is not satisfied.

* * * * *